No. 731,128. PATENTED JUNE 16, 1903.
A. E. REYNOLDS.
FRICTION BRAKE.
APPLICATION FILED JAN. 5, 1903.
NO MODEL. 3 SHEETS—SHEET 1.
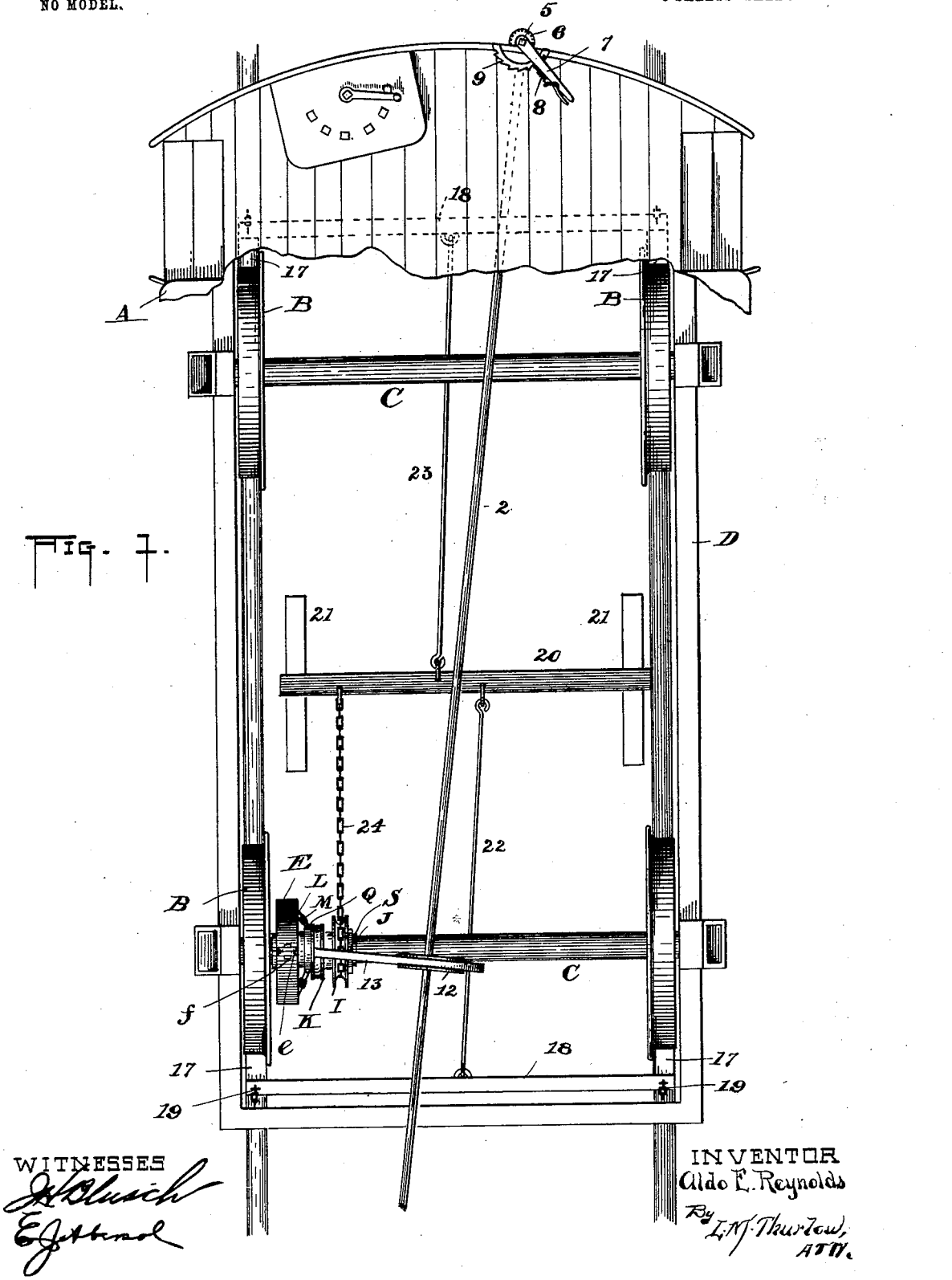
WITNESSES
INVENTOR
Aldo E. Reynolds

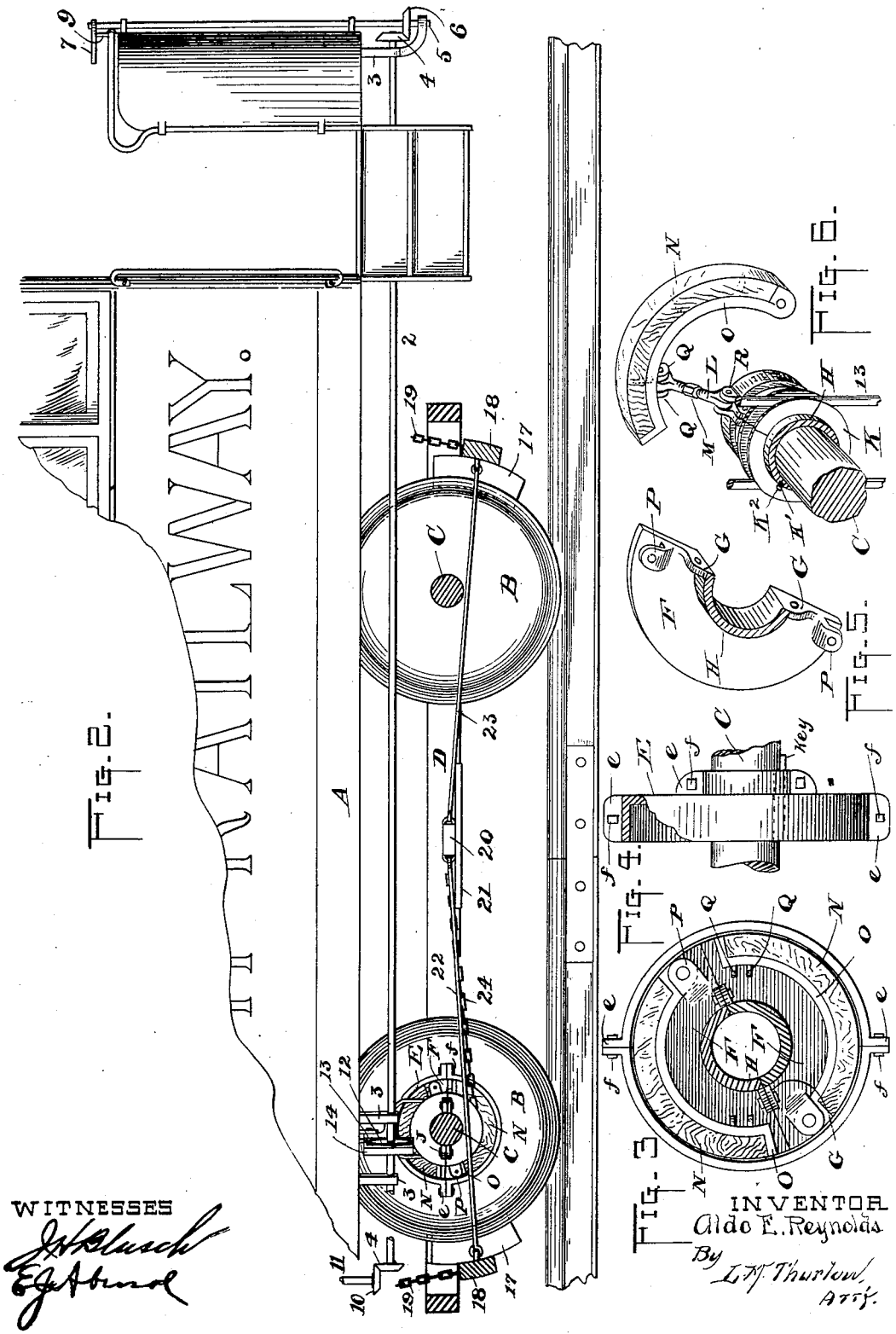

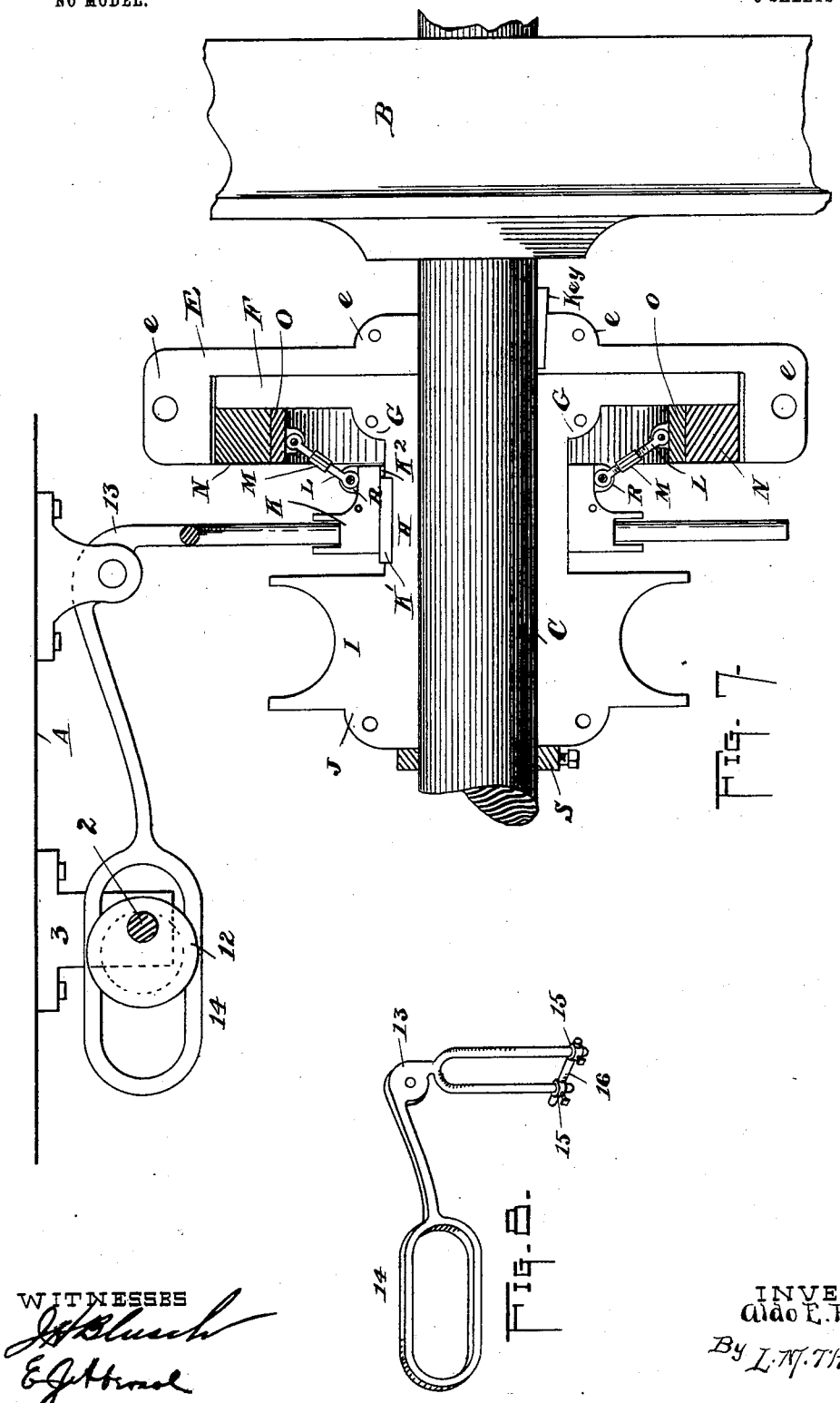

No. 731,128.

Patented June 16, 1903.

UNITED STATES PATENT OFFICE.

ALDO E. REYNOLDS, OF PEORIA, ILLINOIS, ASSIGNOR OF ONE-HALF TO ANDREW O'NEILL, OF PEORIA, ILLINOIS.

FRICTION-BRAKE.

SPECIFICATION forming part of Letters Patent No. 731,128, dated June 16, 1903.

Application filed January 5, 1903. Serial No. 137,789. (No model.)

*To all whom it may concern:*

Be it known that I, ALDO E. REYNOLDS, a citizen of the United States, residing at Peoria, in the county of Peoria and State of Illinois, have invented certain new and useful Improvements in Friction-Brakes; and I do hereby declare that the following is a full, clear, and exact description of the invention, which will enable others skilled in the art to which it appertains to make and use the same.

This invention relates to an improved friction-brake for use on street-railway cars, as well as for rolling-stock of every description on steam-railway and other lines.

The object of my present invention is to provide a friction device to be clamped onto the axle of the car and operated by means of a lever in lieu of the usual crank used on street-railway lines and to supplant the hand-wheel usually employed on the railway-cars.

The invention relates also to certain novel combinations of parts, as will be particularly pointed out in the following specification and in the accompanying claims.

In the drawings attached hereto and forming part of this application, Figure 1 is a top view of the gearing of a street-car having the body of the car removed therefrom, but showing one of the platforms. Fig. 2 is a side elevation of the gearing and the car-body with the near wheels removed to better illustrate the position of the parts. Fig. 3 is an interior view of a friction-drum and the friction-blocks used therein. Fig. 4 is an edge view of the said drum with the friction-blocks removed. Fig. 5 is a perspective view of one-half of a plate which carries the friction-blocks. Fig. 6 is a perspective view of part of one of the car-axles, showing a portion of the friction device thereon and the connection thereof with one of the friction-blocks. Fig. 7 is a side view of the car-axle with one-half of the friction device thereon and showing the operating mechanism therefor. Fig. 8 is a perspective view of a lever for operating the clutch.

A indicates the car, and B the wheels thereof, mounted on the axles C, which in turn have their bearings in the gear-frame D. Upon one of the axles is keyed or otherwise secured a friction-drum E, made in two halves for convenience in attaching it. It is evident that since the wheels are permanently secured to the axle some means of attaching the friction device must be provided, and therefore the drum is made in parts, as shown and described, the lugs $e$ and the bolts $f$ serving as the clamping devices. Within the said drum is a plate made of the halves F F, clamped together by means of the lugs or ears G, Figs. 3 and 5. Each half is provided with hollow extension H, terminating in a half-pulley section, as shown in Figs. 5 and 7. Lugs J on the said pulley-section, together with the lugs G mentioned, serve to clamp the two halves together to form a full plate and a complete chain-drum in Fig. 1. The said plate E and chain-drum I are loose on the axle, the latter being adapted to turn within the former. Made also in two halves and clamped together around the portion H described is a shifting ring K, carrying adjustable toggle-arms. These arms are made in two sections threaded at their free ends and separated and drawn together by means of internally-threaded nuts M. This, however, is too well known to require lengthy description here, and I will therefore proceed with my explanation of the other construction employed in my device. Friction-blocks N are provided for internal contact with the friction-drum E, and these are made in semicircular form, as shown in Figs. 3 and 6, and are secured to castings O, one end of each being pivoted to the plate F by means of the ears P on the latter. A pair of lugs Q near the other end of the castings, on the inside thereof, serve as the connection for the ends of the toggle-arms L, the opposite ends of said arms being carried between the lugs R on the said shifting ring K, as shown. It is understood that in order to shift the friction-blocks N to grip the drum E the shifting ring K must be moved longitudinally on the portion H, and the means for accomplishing this will be described presently; but in passing it is desired to state that the said ring is prevented turning on the tube portion H by means of a groove or keyway $K^2$ and a key $K'$, seated in H, as indicated in Fig. 7. By seating the key and permitting the ring K to slide along it the desired action is had without movement of the parts about one another. In order that the plate F and the chain-drum cannot shift on the shaft in an endwise manner, a ring or collar S is placed on the axle, as in Fig. 7, thus keeping said plate and drum in proper position with reference to the drum E.

I desire at this time to state as one advantage of my brake that it can be applied to any car now used without altering it in the least. The mechanism already described being constructed in sections can be quickly and easily applied and connected to the brake-rods now used, as will appear presently. The mechanism I employ to operate the friction device consists in providing a horizontal shaft 2, journaled beneath the floor of the car in bearings 3, Fig. 2, each end carrying a gear-wheel 4, as shown. The usual vertical shaft 5, to which the brake-crank is ordinarily attached, is provided at its lower end with a gear 6 to mesh with 4, and the upper end of such shaft is provided with a lever-arm 7, carrying a spring-latch 8 to engage the teeth of a rack 9, attached to the dashboard adjacent to the said lever. The shaft 2 extends the entire length of the car and is operated at the opposite end also by a gear 10 on the vertical shaft 11, at that end said gear 10 being above the shaft 2 instead of below, as in the former case, in order that movement imparted to the vertical shaft will turn the shaft 2 in the same direction as by the shaft 5.

Just above the axle on which the friction-gear is mounted an eccentric 12 is secured on said shaft 2. Above the shifting ring K is pivoted a lever having the form of an inverted L, the lower limb of which is bifurcated to straddle the said ring K. The horizontal limb of such lever is formed into a link 14, which straddles the eccentric 12. The said lever is pivoted to the bottom of car, and in consequence thereof moves up and down therewith, as does the shaft 2 and eccentric 12, respectively, so that the positions of the shaft and lever bearings are relatively the same at all times. The bifurcated end allows the lever to move up and down without affecting or interfering with the friction device, as will be clearly understood. In order to strengthen the said bifurcated end of the lever, a pair of rings 15 are employed to secure the ends rigid by means of an intermediate portion 16. This in reality forms a loop, which is strong, much like the link 14. The latter may also be constructed in the same way, or the eccentric may be made in two portions, which may be clamped together with the link inclosed therein.

The brake-shoes for the wheels B and the bars which carry them, as well as the balance of the mechanism connected therewith shown in the drawings, are substantially the same as in common use and may be understood from the following: The brake-shoes 17 are carried on bars 18, which, though not shown, are loosely hung from some part of the car-frame by means of chains 19. At about the middle of the length of the car is a horizontal bar 20, lying transversely of the car and carried to slide on guides 21, also secured to the car-frame, but not so shown. At one side of the middle length of this bar 20 is attached a brake-rod 22, whose other end is attached to the bar 18, carrying the brake-shoes. A second brake-rod 23 in like manner connects the opposite bar 18 to the bar 20 at the other side of its middle length, all of which is shown clearly in Fig. 1. Now the drum I, described hereinbefore, carries a chain 24, which is attached to it by one of its ends, and the other end of such chain is secured to the bar 20 in the position shown with regard to the brake-bars 22 and 23.

The operation of the entire arrangement is as follows: The motorman desiring to stop the car draws the lever 7 toward him, allowing the spring-catch 8 to drop into the teeth of the rack 9 as the lever is pulled around. The action of the shaft transmits motion to the shaft 2 beneath the car in the proper direction to turn the eccentric 12 a portion of a revolution to depress the end of the lever 13 connected therewith. This naturally carries the vertical portion of said lever toward the wheel B as viewed in the several figures, thereby shifting the ring K along the hub and by means of the toggles pushing the blocks N against the interior surface of the drum E. Since the said drum E revolves with the axle C, and the blocks N and the plate F, which carry them, are loose thereon, it follows that when the blocks frictionally engage the drum the entire device must revolve as an integral part, turning the chain-drum I so as to tighten the chain 24. In this tightening of the chain the end of the bar 20 with which it is connected is moved toward the drum, and the first action is to draw upon the brake-bar 23, which in turn brings the brake-shoes against the forward wheels of the car. Then the point of connection of said bar 23 with the bar 20 becoming stationary, by reason of the brake-shoes reaching their limit of movement by contacting with the wheels, at once forms a fulcrum for the bar 20 and converts the latter into a lever. The next action then is to swing the bar upon its fulcrum thus created and move the end to which the rod 22 is connected in the opposite direction, thus drawing the rear brake-shoes against their respective wheels, thus setting all the brakes on the car. Evidently the brakes will be released by reversing the movement of the lever 7 by carrying it back to its initial position. In accomplishing the latter movement the eccentric 12 is turned to raise the horizontal end of the lever 13 and withdraw the friction-blocks N from the drum E. If desired, springs may be employed to assist in withdrawing the parts from the drum; but this has not been found necessary, since sufficient leverage is had by the peculiar arrangement which I employ.

In the practical use of my brake the operator in changing from end to end of his car merely removes the lever 7 from the shaft it is used on and places it upon that at the opposite end in the same manner as the usual controller-lever for electric cars is transferred.

As before stated, the arrangement may be used on all classes of cars, whether steam-driven or otherwise, and it may be adapted for double-truck cars as well as single and, in fact, is applicable to all manner of rolling-stock.

I am aware of several brakes which employ a friction-drum for the car-axle; but a great deal of mechanism becomes necessary in order to have an operative device. My construction is quite simple as compared with the devices referred to, and by its peculiar arrangement few parts are needed, and the power on the brake-shoes is practically unlimited.

Having thus described my invention, I claim—

1. In a friction-brake of the character described, a friction-drum secured to the car-axle and having an internal friction-surface parallel with the axle, a chain-drum on the axle but free thereof and having a hub portion extending toward the drum, a plate on said hub having position within the drum, friction devices pivoted to the plates, a shiftable clutch-ring on the said hub, toggle-arms pivoted at one end to the friction devices and at the other to the shiftable clutch-ring, means in the hands of the operator for shifting the clutch-ring to carry the friction devices into frictional engagement with the drum, a chain attached to the chain-drum and brake mechanism to which the chain is also attached, all being arranged substantially as and for the purposes described.

2. In a friction-brake of the character described, a friction-drum secured on the car-axle and having an internal friction-surface parallel with the axle, a chain-winding drum on the axle adjacent to the friction-drum, a shifting ring on the hub of said winding-drum to turn with the latter, friction devices within the friction-drum, the same adapted to turn with the said winding-drum, means connected to the shifting ring and the friction devices for the purposes set forth and means for shifting the ring to spread the friction devices to carry the same into engagement with the friction-drum to cause the chain-winding drum to revolve with the axle to take up the chain and set the brakes.

3. In a friction-brake of the character described a friction-drum secured on the car-axle, a chain-drum on said axle and normally free thereof, friction devices for driving the chain-drum through the medium of the friction-drum, shifting means for engaging the friction devices with the friction-drum, a lever pivoted on the bottom of the car beneath the same and having engagement at one end with the shifting means, its other end having a link, a rock-shaft beneath the car extending the full length thereof, an eccentric on said rock-shaft within the link, a gear-wheel on each end of the shaft, a vertical rock-shaft at each end of the car, and a gear-wheel on each said vertical shaft for engaging the gears of the shaft beneath the car all arranged substantially as set forth and described.

4. In a friction-brake mechanism of the character described, the combination of the car-axle, a friction-drum fixed thereon, a chain-winding drum loosely mounted on the axle, friction devices within the drum and adapted to engage the same said devices moving only with the said chain-winding drum, a shifting ring, members pivoted at one end to the friction devices and at the other to the shifting ring and means for moving said ring for engaging the friction devices with the friction-drum to wind the brake-chain upon the chain-winding drum.

5. In a friction-brake mechanism of the character described, the combination of the car-axle, a friction-drum fixed thereon, a chain-winding drum loosely mounted on the axle, friction devices within the drum and adapted to engage the same, said devices moving only with the said chain-winding drum, a shifting ring, members pivoted at one end to the friction devices and at the other to the shifting ring and means for moving the ring to engage the friction devices with the drum which consists of a lever pivoted at its middle to the bottom of the car, one end engaging said shifting ring, a rock-shaft journaled beneath the car and extending the entire length thereof, an eccentric secured to said shaft and engaging the free end of the lever, a gear-wheel at each end of the shaft, a vertical rock-shaft at each end of the car, a gear-wheel on each for engaging the gears of the shaft beneath the car and adapted by a movement of either of the vertical shafts to impart movement to the lower shaft to shift the clutch mechanism, for the purposes set forth.

6. In a friction-brake mechanism the friction-drum E fixed to the car-axle, the chain-drum I loosely mounted on the axle and having the plate F formed therewith and within the said friction-drum, friction devices N pivoted to the plate and adapted for engaging the interior surface of the drum, a shiftable ring K adjacent to the friction devices N, adjustable connections connecting the said ring K and members N in combination with means for shifting the ring to spread the friction devices and force them into contact with the friction-surface of the drum for the purposes explained.

7. In a friction-brake mechanism the friction-drum E fixed to the car-axle, the chain-drum I loosely mounted on the axle and having the plate F formed therewith and within the said friction-drum, friction devices N pivoted to the plate and adapted for engaging the interior surface of the drum, a shiftable ring K adjacent to the friction devices N, adjustable connections connecting the said ring K and members N in combination with means for shifting the ring to spread the friction devices and force them into contact with the friction-surface of the drum consisting of the bent lever 13 pivoted to the car and having one end in engagement with the ring K, the rock-shaft 2 beneath the car and extending the full length thereof, the eccentric 12 thereon for engaging the free end of said lever 13, the gear-wheels 4 on the ends of the shaft 2, the vertical rock-shafts 5 and 11 at the ends of the car, the gears 6 and 10 thereon for engaging the gears 4 and levers for turning said vertical shafts as set forth.

In testimony whereof I affix my signature in presence of two witnesses.

ALDO E. REYNOLDS.

Witnesses:
L. O. WALLACE,
J. H. BLUSCH.